United States Patent

[11] 3,551,773

| [72] | Inventors | Alan C. Dannettell;<br>Robert V. Nemiroff, Philadelphia; David C. Tedd, Cornwells Heights, Pa. |
|---|---|---|
| [21] | Appl. No. | 625,148 |
| [22] | Filed | Mar. 22, 1967 |
| [45] | Patented | Dec. 29, 1970 |
| [73] | Assignee | Eaton Yale & Towne Inc.<br>Cleveland, Ohio<br>a corporation of Ohio |

[54] DRIVE SYSTEM FOR AN ELECTRIC TRUCK
20 Claims, 3 Drawing Figs.

[52] U.S. Cl. .................................................. 318/341, 318/416
[51] Int. Cl. ................................................... H02p 7/28
[50] Field of Search.......................................... 318/314, 341, 430, 400—403, 415, 416, 472, 479

[56] References Cited
UNITED STATES PATENTS

| 3,414,074 | 12/1968 | Dannettell..................... | 318/345X |
| 3,297,930 | 1/1967 | Payne............................ | 318/341X |
| 3,349,309 | 10/1967 | Dannettell..................... | 318/341 |
| 3,361,921 | 1/1968 | Montross et al. ............. | 318/415X |

Primary Examiner—Oris L. Rader
Assistant Examiner—Robert J. Hickey
Attorney—Teagno & Toddy ABSTRACT: In an electric truck having a DC motor which is energized by unidirectional current pulses of uniform amplitude which are applied at a substantially fixed frequency and have a duration which may be adjusted over a predetermined range to vary the energization of the motor, means are provided for limiting the durations of the pulses and the rate of increase of the durations to predetermined values to limit the acceleration of the truck according to a predetermined function and to protect the system from overloads under various conditions.

DRIVE SYSTEM FOR AN ELECTRIC TRUCK

BACKGROUND OF THE INVENTION

This invention relates to a drive system for electric trucks and more particularly to such a system for protectively limiting the energization of the drive motor of such a truck under various conditions.

In electric trucks which employ semiconductor current switching means for selectively applying unidirectional current pulses to the motor, it is important that the current which is drawn through the semiconductors be closely controlled and limited to prevent damage since such devices can be destroyed by overloads of very brief duration. Overload currents may be caused by attempting to produce unnecessarily abrupt acceleration of the truck or by plugging, that is, rapid reversing of the truck.

In such trucks in which a plurality of parallel-connected transistors are employed for carrying the motor current, it is also desirable to deenergize the motor immediately if any one of the parallel-connected transistors does not turn off between successive pulses thereby to prevent the truck from starting at high speed.

SUMMARY OF THE INVENTION

Among the several objects of the present invention may be noted the provision of a drive system for an electric truck in which the energization of a DC drive motor is protectively limited; the provision of such a system in which the energization of the motor is limited to a value which varies as a predetermined function of time after the motor is initially energized thereby to limit the acceleration of the truck according to that predetermined function; the provision of such a drive system in which the energization of the motor is limited to a value which varies as a predetermined function of the magnitude of plugging currents in said motor whereby plugging of the truck is limited according to said inverse function; the provision of such a drive system in which a plurality of parallel-connected transistors are employed for applying to the motor a series of unidirectional current pulses of uniform amplitude and wherein said drive system includes means for deenergizing the motor if any one of the transistors does not turn off between successive pulses; the provision of such a drive system in which the motor is energized through the contacts of a contactor and said system includes means for terminating a pul se being applied to said motor when said contactor is deenergized whereby the contactor contacts do not break the motor current; the provision of such a system which is highly reliable; and the provision of such a drive system which is relatively simple and inexpensive. Other objects and features will be in part apparent and in part pointed out hereinafter.

Briefly, an electric truck drive system according to the present invention includes a DC motor, a DC source, and semiconductor current switching means for selectively applying to the motor from the source a series of unidirectional current pulses of uniform amplitude. The current switching means includes means for generating the pulses at a substantially fixed frequency and also includes manually adjustable means for varying the durations of the pulses over a predetermined range thereby to vary the energization of the motor. The current switching means further includes means for limiting the durations of the pulses to a value within the range of adjustment, which value varies under various conditions to protectively limit the energization of the motor and the current flowing through the semiconductor current switching means. In one aspect of the invention the limiting value varies as a predetermined function of time after the motor is initially energized thereby to limit acceleration of the truck. In another aspect of the invention the limiting value varies as a predetermined inverse function of reverse currents flowing in the motor thereby to limit plugging of the truck.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
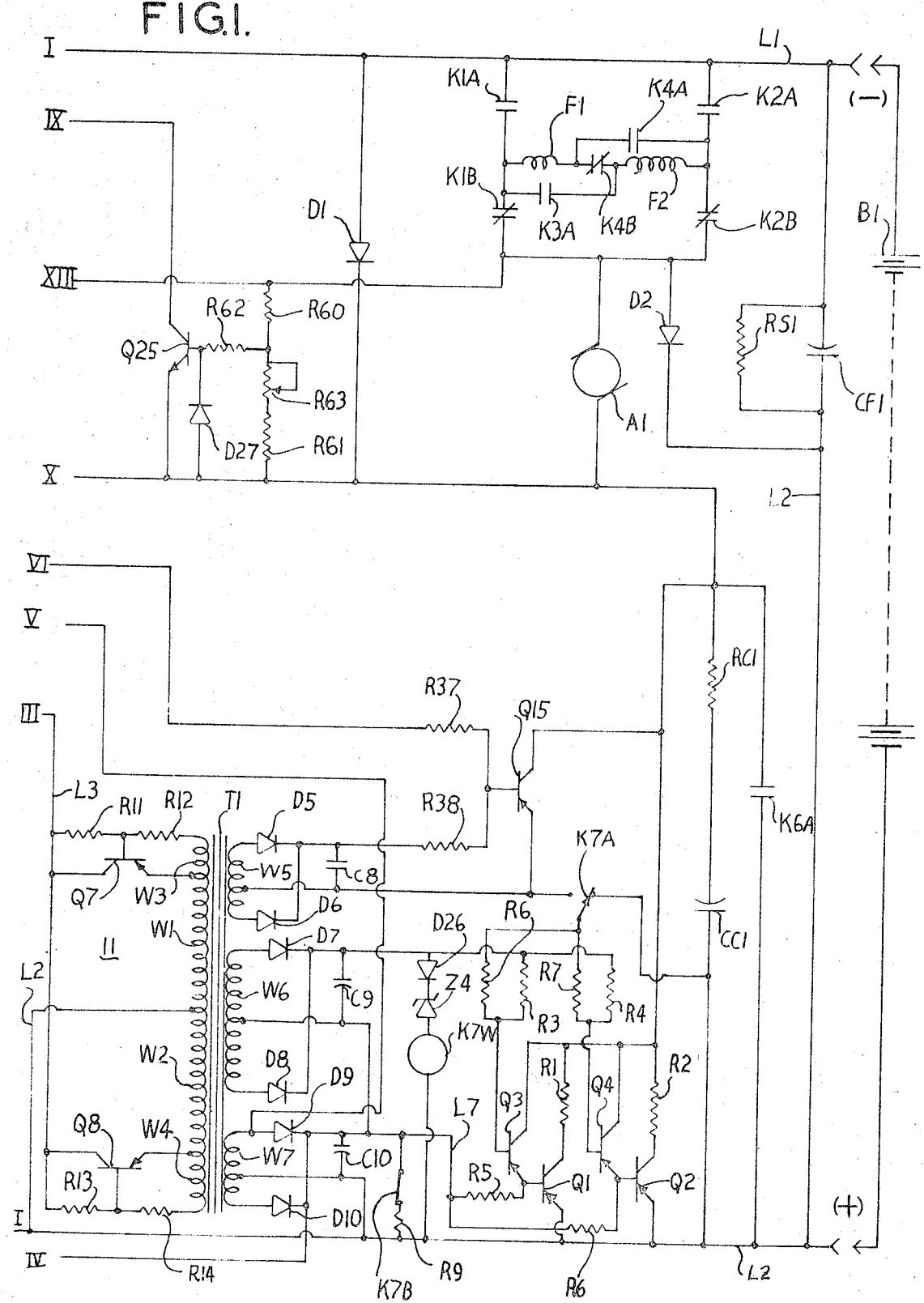
FIGS. 1, 2 and 3 together are a schematic circuit diagram of a drive system according to this invention, connections between the three FIGS. being indicated by corresponding Roman numerals.

Referring now to the drawings, there are indicated at F1 and F2 in FIG. 1 the field windings of a DC traction motor. The armature of this motor is indicated at A1. The motor is energized from batteries indicated at B1 which provide direct current to a pair of bus bars or supply leads L1 and L2. A filter capacitor CF1 and a bleed resistor RS1 are connected across these leads. The bleed resistor discharges the capacitor for safety reasons when the battery is disconnected.

Current for energizing the various control circuits described hereinafter is provided to a supply lead L3 (FIG. 2) from lead L1 through a fuse FS and a set of normally open seat switch contacts SW1. Current provided to lead L3 is filtered by a network which includes a series resistor RS2 and a filter capacitor CF2.

The field windings F1 and F2 considered together may be connected in series with the armature A1 by means of a pair of contactors each of which includes a set of normally open contacts K1A and K2A respectively, and a set of normally closed contacts K1B and K2B respectively. Contacts K1A and K1B are operated by a winding K1W and contacts K2A and K2B are operated by a winding K2W (See FIG. 3). Thus, when one of the contactor windings K1W or K2W is energized, the field windings F1 and F2 are connected in series with the armature A1 in one sense or polarity and when the other contactor winding is energized the field windings are connected in series with the armature A1 in the other sense or polarity thereby providing rotation of the motor in the reverse direction.

Field windings F1 and F2 may also be connected either in series or parallel with each other by means of a pair of contactors which include normally open contacts K3A and K4A and normally closed contacts K4B. Contacts K3A are operated by a winding K3W while contacts K4A and K4B are operated by a winding K4W (See FIG. 3). Each of the contactor windings is shunted by a respective diode DS for shunting switching transients.

As is explained in greater detail hereinafter, the traction motor is at low speeds energized by unidirectional pulses of current passed by a series of semiconductor current switching devices. To permit the inductively stored current to flow during the intervals between the pulses and to thus aid in producing torque, the field windings and the armature together are shunted by a diode D1. One end of armature A1 is also connected to supply lead L2 by a diode D2 for a purpose described hereinafter.

Figure 3:
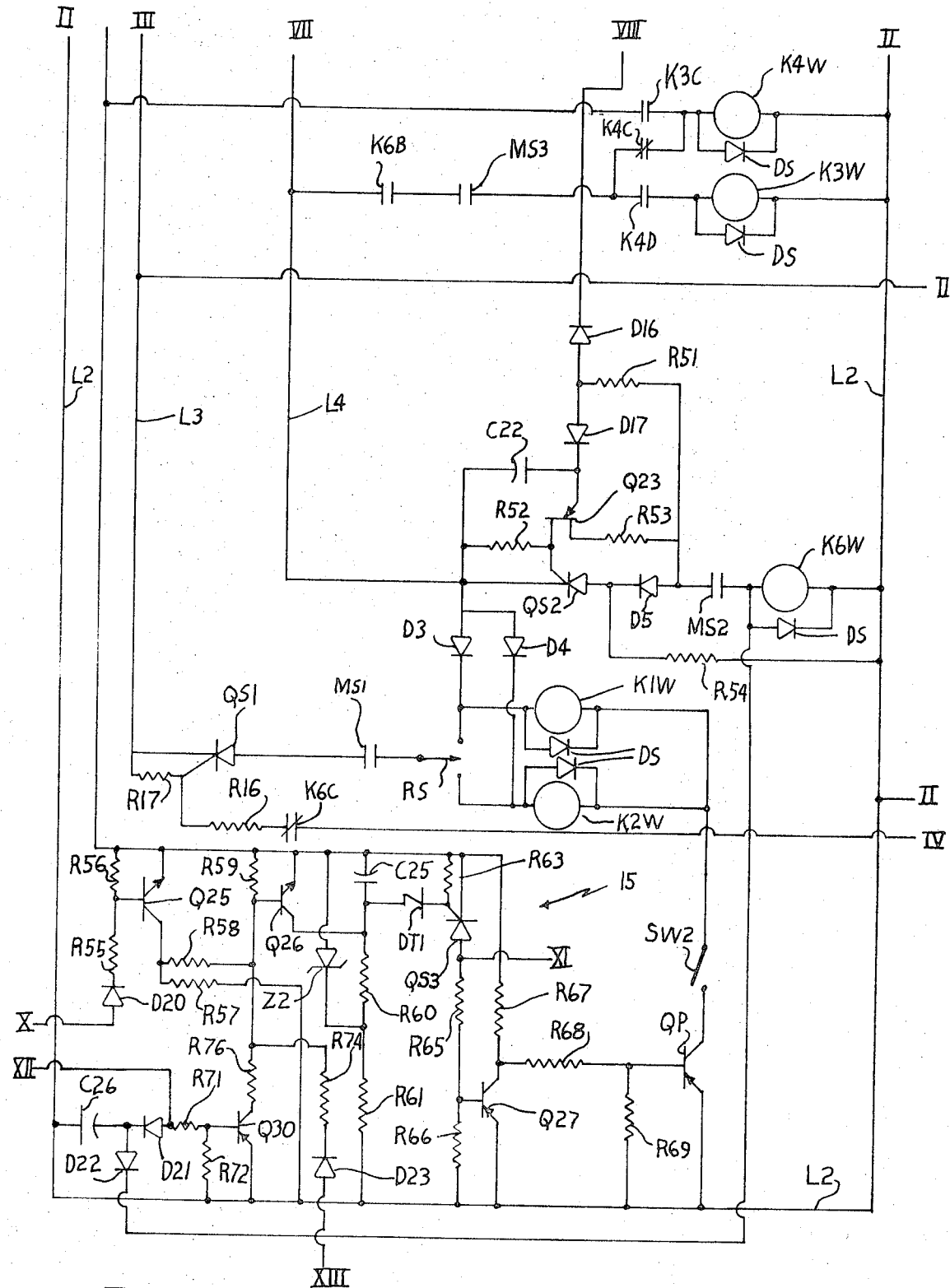

The armature A1 and the field windings F1 and F2 are connected across supply leads L1 and L2 by circuits which include alternate paths to the lead L2. One of these paths passes through a set of normally open contacts K6A operated by the winding K6W (FIG. 3). Winding K6W also operates a set of normally open contacts K6B and a set of normally closed contacts K6C. The other path passes through the collector-emitter circuits of a series of parallel-connected PNP transistors, two of which are shown by way of example at Q1 and Q2.

It is to be understood that said series of transistors will include as many parallel transistors as may be necessary to carry the motor current. Transistors Q1 and Q2 function as semiconductor current-switching means for applying unidirectional pulses of current to the motor. In other words, transistors Q1 and Q2 are operated either in a cutoff or in a fully saturated state. The collector leads of the parallel-connected transistors Q1 and Q2 include low value resistors R1 and R2 respectively, which insure that the current drawn by the motor is shared substantially equally by the parallel-connected transistors. The collector-emitter circuits of transistors Q1 and Q2 are shunted by a commutating network comprising a capacitor CC1 and a resistor RC1.

As is described in greater detail hereinafter, the duty cycle of these current switching transistors, and thus also the energization of the traction motor, may at certain relatively low speeds be controlled by varying the setting of a rheostat R24 which comprises a timing element of a pulse width controlling multivibrator circuit described hereinafter with reference to FIG. 2.

Rheostat R24 is operated by the truck's accelerator or throttle mechanism which may be either foot or hand operated but is hereinafter referred to as manually operable, that term being construed to include either hand or foot operation. Also mechanically operated by the accelerator are a series of switches MS1, MS2 and MS3 (FIG. 3) which are successively operated in the order given as the accelerator is progressively advanced to call for greater speeds of the traction motor.

One side of each of the contactor windings K1W and K2W is connected to supply lead L3 through the switch MS1, a respective side of a double-pole center-off switch RS, and the anode-cathode circuit of an SCR (silicon-controlled rectifier) QS1. The switch RS is manually operated and allows the operator of the truck to selectively energize one or the other of windings K1W and K2W thereby to determine the direction of movement upon energization of the traction motor. As is explained in greater detail hereinafter, SCR QS1 prevents energization of the contactor windings until suitable bias voltages are available to the control circuitry.

The other end of each of the contactor windings K1W and K2W is connected to lead L2 through a circuit which includes a seat-operated safety switch SW2 and the collector-emitter circuit of a PNP transistor QP. Transistor QP is operated under the control of an electronic protection circuit indicated generally at 15.

Initial movement of the accelerator closes switch MS1 allowing power to be applied, through the reversing switch RS, to one or the other of the contactor windings K1W or K2W. When one of these windings is energized, power can then be applied to the traction motor through the transistors Q1 and Q2, the degree of energization being, in general, controlled by rheostat R24. When power is applied to one or the other of windings K1W or K2W through switches MS1 and RS, negative power is also applied to a line L4 through a respective diode D3 or D4.

At the end of the range of speed control provided by rheostat R24, the accelerator mechanism closes switch MS2. Contactor winding K6W is connected to lead L4 through switch MS2, a diode D5 and the anode-cathode circuit of an SCR QS2. Thus, assuming SCR QS2 is conducting, the closure of switch MS2 energizes contactor winding K6W. The resulting closure of contacts K6A bypasses the current switching transistors Q1 and Q2 and applies the full battery voltage to the motor thereby producing a motor speed above that which can be provided by the pulse width modulated current passed by the switching transistors.

Further movement of the accelerator closes switch MS3. Since the contacts K6B are closed by the previous energization of contactor winding K6W, the closing of switch MS3 energizes contactor windings K3W and K4W through their interlocking contacts K3C, and K4C and K4D. The operation of contacts K3A, K4A and K4B by their respective windings places the motor field windings F1 and F2 in parallel rather than in series and produces a still further increase in the speed of the traction motor.

During operation in the speed range where the energization of the traction motor is controlled by varying the duty cycle of the current switching transistors Q1 and Q2, conduction through these transistors is controlled through respective PNP driver transistors Q3 and Q4. Transistors Q3 and Q4 are operated as emitter-followers, and their emitters are connected directly to the base terminals of the respective power switching transistors. By means described in greater detail hereinafter, a suitable bias voltage is applied to the base terminals of transistors Q3 and Q4 through resistors R3 and R4 and, similarly, a suitable bias voltage is supplied to the base terminals of transistors Q1 and Q2 through resistors R5 and R6 from a lead as indicated at L7, Lead L7 is selectively connected to supply lead L2 through a resistor R9 by a set of normally closed relay contacts K7B.

A pulse signal for controlling the periods of energization or duty cycle of the power switching transistors Q1 and Q2 is selectively applied to the base terminals of driver transistors Q3 and Q4 through respective resistors R6 and R7 from the common contact of a set of double throw relay contacts K7A. One of the alternate contacts is connected to the pulse source described hereinafter and the other is connected to the supply lead L2.

Current taken from leads L3 and L2 is employed to energize an inverter power supply indicated generally at 11. Inverter power supply 11 is essentially conventional and comprises a transformer T1 having primary windings W1 and W2 and feedback windings W3 and W4 which are interconnected with a pair of PNP transistors Q7 and Q8 in an oscillator circuit for converting the DC available from leads L3 and L2 to alternating current in conventional manner. Transistors Q7 and Q8 are biased by respective networks comprising resistors R11—R14.

Transformer T1 includes a plurality of center tapped secondary windings W5—W7. These secondary windings provide alternating currents which are full-wave rectified by diodes D5—D10 and filtered by capacitors C8—C10 to provide various DC voltages for properly biasing the transistors Q1—Q4 described hereinbefore and the various other transistor control circuits described hereinafter. As is understood by those skilled in the art, these bias voltages are necessary for the proper and safe operation of the transistor circuits and are available only after the inverter oscillations have built up to substantially full amplitude. Further, this buildup of the oscillations may take a significant period of time after power is applied to lead L3 by the closure of contacts SW1.

A signal taken from winding W7, through the lead indicated at IV, contacts K6C and a voltage divider comprising resistors R16 and R17, is applied to the gate terminal of SCR QS1. The values of resistors R16 and R17 are selected so that SCR QS1 is triggered into conduction only when the oscillations of the inverter power supply 11 have reached substantially full amplitude. Thus, SCR QS1 will not permit the contactor windings K1W and K2W to be energized until the proper bias voltages are applied to the transistor circuits by the inverter power supply 11.

To keep the output transistors Q1 and Q2 and the driver transistors Q3 and Q4 in a cutoff state until bias voltages are available, the relay actuating winding K7W which operates contacts K7A and K7B is energized from the inverter transformer winding W6 through a diode D26 and a voltage dropping Zener diode Z4. Because of the voltage dropping action of Zener diode Z4, winding K7W is not energized until the inverter power supply is providing substantially full bias voltages. Until this occurs, the base circuits of the driver and output transistors are connected to the supply lead L2 through the contacts K7A and K7B respectively which keeps them cutoff. Similarly, if the available bias voltage should drop below a predetermined safe level during operation of the truck, e.g., as might be caused by a drop in supply voltage or a failure in the inverter circuitry, the transistors Q1—Q4 would be immediately cut off.

Figure 2:
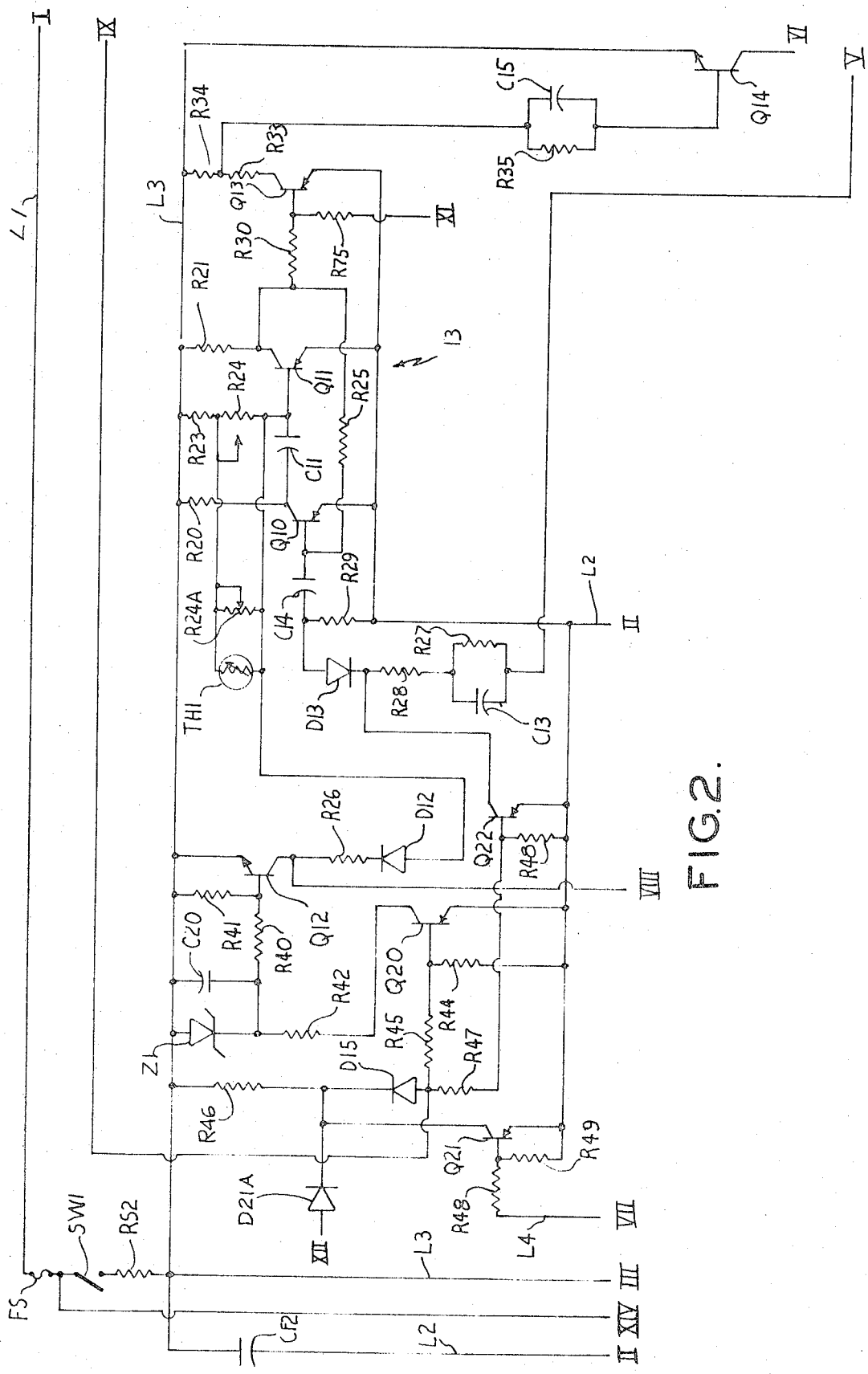

One side of secondary winding W7 is connected to a lead indicated at V for providing AC triggering signals of substantially constant frequency to a multivibrator circuit indicated generally at 13 (FIG. 2). Multivibrator circuit 13 includes a pair of PNP transistors Q10 and Q11 interconnected in an essentially conventional monostable or one-shot multivibrator circuit. The emitters of transistor Q10 and Q11 are connected to lead L2 and their collectors are connected to lead L3 through respective load resistors R20 and R21. The output signal from the collector of transistor Q10 is coupled to the base of transistor Q11 through a timing capacitor C11 and the base of this transistor is normally forward biased by current taken from lead L3 through a fixed resistor R23 and the throttle operated rheostat R24. The output signal from the collector of transistor Q11 is applied to the base of transistor Q10 through a resistor R25 to provide the regenerative switching mode of operation characteristic of the monostable multivibrator circuit. As is understood by those skilled in the art, the circuit comprising transistors Q10 and Q11 normally remains in a stable state in which transistor Q11 conducts and transistor Q10 is cut off but that the circuit may be triggered, by signals applied to the base of transistor Q10, to a second state in which transistor Q10 conducts and transistor Q11 is cut off. This second state persists for a period of time normally determined by the relative values of capacitor C11 and of rheostat R24 and resistor R23.

Rheostat R24 is shunted by a presettable rheostat R24A by means of which the maximum value of resistance (corresponding to maximum pulse width and speed) may be preselected. Rheostat R24 is further shunted by an NTC thermistor TH1 which is thermally coupled to the output transistors Q1 and Q2. This thermistor thus operates to reduce the pulse width provided by the multivibrator circuit 13 when the output transistors tend to heat up, e.g., as might happen if full width pulses were applied for an extended period while the motor was stalled. A conventional thermostat which switches in a fixed resistance may also be used to provide this protective function.

Rheostat R24 and resistor R23 are further shunted by a circuit which includes a diode D12, a resistor R26 and the collector-emitter circuit of an NPN transistor Q12 for the purpose of limiting acceleration and plugging as described hereinafter.

The signals provided by winding W7 through lead V are coupled to the base of transistor Q10 through a shaping network comprising resistors R27—R29, a pair of capacitors C13 and C14 and a diode D13. The signals coupled through this network cause the monostable multivibrator circuit including transistors Q10 and Q11 to be triggered at a substantially constant rate determined by the operating frequency of inverter 11.

An output signal taken from the collector of transistor Q11 is applied through a resistor R30 to the base of a PNP transistor Q13 which is operated as a common emitter amplifier. The emitter of transistor Q13 is connected to lead L2 and its collector is connected to lead L3 through a pair of load resistors R33 and R34.

A pulse signal taken from between resistors R33 and R34 through a network comprising a resistor R35 and a capacitor C15 is further amplified by an NPN transistor Q14 and a PNP transistor Q15 (FIG. 1), appropriate biasing and signal coupling being provided through resistors R37 and R38.

The amplified pulse signals provided at the emitter of transistor Q15 are applied, through contacts K7A and resistors R6 and R7, to the base terminals of the driver transistors Q3 and Q4 as described previously. The power amplifier stages comprising transistors Q1—Q4, when driven by this pulse signal, apply unidirectional pulses of current to the traction motor. The frequency at which the pulses are generated and applied to the motor is determined by the frequency of operation of the inverter power supply 11 while, under normal running conditions, the duration of each pulse and the duty cycle of the power transistors Q1 and Q2 are determined by the adjustable period of operation of the monostable multivibrator circuit 13.

As is explained in greater detail in applicant Dannettell's copending application Ser. No. 415,974, now U.S. Pat. No. 3,349,309 and in Dannettell's earlier issued U.S. Pat. No. 3,243,681, when the traction motor is being energized through the transistors Q1 and Q2, the duty cycle of these transistors and the mean current provided to the traction motor can, under normal continuous running conditions, be selectively varied over a predetermined range by adjusting the setting of rheostat R24 thereby to control the speed of the truck.

As noted previously rheostat R24 is shunted by a circuit which includes the collector-emitter circuit of transistor Q12. Conduction in transistor Q12 can thus override conduction through rheostat R24 and thereby effectively limit or control the durations of the pulses generated by the monostable multivibrator. The base-emitter circuit of transistor Q12 is biased through a network comprising resistors R40 and R41 from a circuit which includes a timing capacitor C20 and which controls conduction in transistor Q12 according to a predetermined function of time after initial energization of the traction motor. Capacitor C20 is charged through the collector-emitter circuit of a PNP transistor Q21 through a network comprising resistors R44—R46 and a diode D15. Transistor Q21 is forward biased from line L4 through a network comprising resistors R48 and R49 when either of the reversing contactor windings K3W or K4W is energized. The maximum voltage to which capacitor C20 may be charged is limited by a Zener diode Z1.

This circuit operates to limit or program acceleration substantially as follows. Prior to initial energization of the motor, that is, when switch MS1 is open, transistor Q21 is biased off and thus transistor Q20 is turned on and conducting. Conduction in transistor Q20 charges capacitor C20 fully to the limit determined by Zener diode Z1. Transistor Q12 is thus strongly biased into conduction from the capacitor circuit and thereby shunts and effectively overrides any conduction through the throttle rheostat R24. The pulses generated by the multivibrator circuit are thus limited to a relatively short predetermined duration.

When switch MS1 is closed and one or the other of the contactor windings K1W, K2W is energized and power is applied to the lead L4, transistor Q21 is turned on thereby turning off transistor Q20. Timing capacitor C20 is thus permitted to discharge through resistors R40 and R41 and the base-emitter circuit of transistor Q12. Conduction through transistor Q12 will thus diminish according to a predetermined function so that the limiting value of pulse duration provided by the multivibrator circuit 15 also increases according to a predetermined function or program. As the limiting value thus rises, control of pulse duration is increasingly returned to the throttle rheostat R24. Accordingly, it will be readily seen by those skilled in the art that when the motor is initially energized by the closure of switch MS1, the pulses of current applied to the motor are limited to a quite short duration and thereafter may be increased in duration according to a function or program predetermined by the charging of capacitor C20. By limiting the rate of increase of pulse durations for a predetermined time after initial energization, acceleration of the truck is similarly limited.

The collector of transistor Q21 is also connected, through the diode D15 and a voltage divider comprising resistors R47 and R48, to the base input circuit of a PNP transistor Q22. The emitter of transistor Q22 is connected to the lead L2 and its collector is connected to the junction between diode D13 and resistor R28 in the trigger signal input circuit of the multivibrator 13.

As noted previously transistor Q21 is turned on when one or the other of the contactor windings K1W and K2W is energized and thus, under such conditions, transistor Q22 is cut off and does not effect the triggering of the multivibrator circuit 13 by the inverter 11. When, however, the respective contactor winding K1W or K2W is deenergized the transistor Q21 is turned off and the transistor Q22 conducts. Conduction in transistor Q22 cuts off the triggering signal input to the multivibrator and thus insures that the power switching transistors Q1 and Q2 are not conducting the full pulse current at the moment the respective contactor contacts open, thus reducing the wear and burning of those contacts.

The collector of transistor Q12, in addition to being connected to the throttle rheostat R24, is also connected, through the lead indicated at VIII and a diode D16, to the emitter biasing circuit of an unijunction transistor Q23. The emitter circuit of unijunction transistor Q23 is normally biased through a resistor R51 and a second diode D17. The base-one terminal of unijunction transistor Q23 is connected to the gate of SCR QS2 and to line L4 through a resistor R52. The base-two terminal of this transistor is connected to the anode circuit of SCR QS2 through a resistor R53 and the diode D5. Its emitter base-one circuit is shunted by a capacitor C22 so that, when this unijunction transistor is forward biased, it functions as a relaxation oscillator for triggering SCR QS2.

When transistor Q12 is conducting and thus limiting the motor energization as described above, it also shunts bias current flowing through resistor R51 away from the emitter of the unijunction transistor Q23 so that the SCR QS2 is not triggered. When conduction in transistor Q12 falls off due to the discharging of timing capacitor C20, biasing current is again supplied to the emitter of unijunction transistor Q23 so that this transistor oscillates and triggers SCR QS2. As noted previously, SCR QS2 is connected in series with relay winding K6W and thus this winding cannot be energized until SCR QS2 is triggered into conduction. Thus the relay contacts K6A cannot be operated to apply full battery voltage to the motor until the period of programmed acceleration is substantially completed. Once SCR QS2 is triggered, holding current is provided to its anode circuit through a resistor R54 so that the SCR remains in conduction even though contacts MS2 are opened.

While the programmed acceleration provided by the discharging of capacitor C20 satisfactorily limits energization of the traction motor during acceleration from a stopped or stationary condition, plugging of the truck, that is, rapid reversing, could still produce damaging currents and possibly dangerous acceleration forces if not otherwise limited.

When the field connections of the traction motor are rapidly reversed to produce rotation in a second direction when the motor is already rotating in a first direction, the motor acts as a generator until the truck is brought to a halt. In the armature, the generated current opposes the applied pulses. To prevent the generated armature current from greatly boosting the field energization and thereby producing an unstable generating action, the one side of the armature is connected by diode D2 to lead L2. Diode D2 is forward biased when the motor, acting as a generator, develops a voltage greater than the battery voltage. In this condition, the armature is effectively connected across the battery through diodes D1 and D2 which are both forward biased and the current generated in the armature is, in effect, pumped back into the battery rather than further augmenting the field excitation.

The generated voltage developed across the armature provides an indication of plugging and, in the range in which the generated voltage is less than the battery voltage, the generated voltage varies substantially as a function of the degree of plugging, the diode D2 being in this latter range reverse biased and substantially inoperative. A preselected portion of the voltage across the armature is applied, through a network comprising resistors R60—R62 and rheostat R63, to the base-emitter circuit of an NPN transistor Q25. The base-emitter circuit of this transistor is also shunted by a diode D27 which protects the transistor from reverse voltages during normal or nonplugging operation. During plugging, transistor Q25 is forward biased and thus conducts. When diode D2 is not conducting, conduction in transistor Q25 varies as a function of the armature voltage and hence also the degree of plugging. The collector of transistor Q25 is connected, through the lead indicated at IX and resistor R45, to the base of the transistor Q20 through which the timing capacitor C20 is charged. By means of this connection, transistor Q20 may be forward biased independently of the operation of transistor Q21. Thus, during plugging, capacitor C20 is charged through transistor Q20 and transistor Q12 conducts and limits the pulse width and the energization of the motor as described previously. Thus, during plugging, the energization of the motor is limited to a relatively low level which, when diode D2 is not conducting, varies as an inverse function of the degree of plugging independently of the setting of the throttle rheostat R24. Thus a so-called proportional control is exercised over the degree of plugging which may be produced by operation of the reversing switch and the accelerator.

Protection circuit 15 is operative during pulsed operation at low speeds to deenergize the contactor windings K3W and K4W and the traction motor by cutting off transistor QP when the battery voltage is applied to the motor for longer than the normal period between successive pulses thereby to prevent the full source voltage from being applied abruptly to the motor upon starting if one of the transistors Q1 or Q2 should short. When the battery voltage is applied to the motor, an NPN transistor Q25 is forward biased through the connection indicated at X, a diode D20 and a voltage divider comprising resistors R55 and R56. When transistor Q25 conducts, it turns off an NPN transistor Q26 which is normally biased on by current flowing through a network of resistors R57, R58 and R59. When transistor Q26 is turned off, a timing capacitor C25 charges at a predetermined rate from a voltage divider comprising a pair of resistors R60 and R61. The maximum voltage to which capacitor C25 can charge is limited by a Zener diode Z2. When capacitor C25 charges to a predetermined level within its range, a breakdown or trigger diode DT1 conducts and triggers an SCR QS3 into conduction by applying a pulse across a resistor R63. Conduction in SCR QS3 forward biases a PNP transistor Q27 through a voltage divider including a pair of resistors R65 and R66. When transistors Q27 conducts it turns off transistor QP by shunting bias current which normally flows through a bias network comprising resistors R67, R68 and R69. Turning off transistor QP deenergizes whichever contactor winding K1W or K2W may then be energized.

During normal pulsed operation the operation of protection circuit 15 is substantially as follows. When an energizing pulse is being applied to the traction motor, capacitor C25 charges since transistor Q25 is turned on and transistor Q26 is turned off. When the energizing pulse ends, capacitor C25 is discharged by a transistor Q26. The charging rate of capacitor C25 is preselected, in relation to the triggering threshold of trigger diode DT1, so that the triggering threshold is not reached until an interval longer than the normal period between successive pulses has passed. Accordingly, when the pulse energizing circuit is working properly, SCR QS3 is not triggered. If, however, one or more of the switching transistors Q1, Q2 should short, the battery voltage will continue to be applied to the motor for longer than the normal period between successive pulses and capacitor C25 will continue to charge and will reach the trigger threshold of diode DT1. When diode DT1 triggers SCR QS3 transistor Q27 is forward biased and turns off transistor QP. When transistor QP is turned off, the previously energized contactor winding K1W or K2W is deenergized thereby deenergizing also the traction motor.

The anode of SCR QS3 is also connected to the base of the amplifier transistor Q13 through the connection indicated at XI and a resistor R75 so that, simultaneously with the deenergizing of the contactor winding K1W or K2W, all of the switching transistors Q1, Q2 are turned on. Accordingly, all of the switching transistors share the motor current during the time it takes the respective contactor winding to release its contacts and thus the shorted transistor does not have to carry the entire motor current between pulses. The possibility of this transistor being burned into an open circuit condition is thereby reduced.

To prevent the operation of the protection circuit 15 before the motor is initially energized, the base terminal of a PNP transistor Q30 is connected, through a voltage divider comprising resistors R71 and R72, the lead indicated at XII and diode D21A to the collector of transistor Q21 (FIG. 2). This base circuit is also shunted by a capacitor C26 which slows its response to prevent operation of the protection circuit between the deenergization of winding K6W and the opening of contacts K6A. As noted previously, transistor Q21 is turned off when neither of the contactors K1W, K2W is energized and thus, in such a situation, transistor Q30 is turned on independently of the application of energizing pulses to the traction motor. The collector of transistor Q30 is connected, through a resistor R76, to the base of transistor Q26 and thus, when transistor Q30 is turned on, transistor Q26 conducts and discharges capacitor C25 thereby preventing the protection circuit from deenergizing the traction motor. Similarly, to prevent the operation of the protection circuit when the motor is being operated at full battery voltage, the base circuit of transistor Q30 is connected, through a diode D22, to contactor winding K6W. Thus, when contactor winding K6W is energized, transistor Q30 is forward biased and capacitor C25 is again prevented from charging so that the traction motor is not deenergized.

To prevent the operation of the protection circuit during the brief interval after one or the other of contactor windings K1W or K2W is energized and before the respective contacts operate. The base terminal of transistor Q26 is connected, through a resistor R74, a diode D23 and the lead indicated at XIII to a junction between the armature and field windings of the traction motor. Until the respective contacts are operated, this point stays at a relatively positive potential and thus transistor Q26 is forward biased to prevent charging of capacitor C25 until the motor itself receives power.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In an electric truck, a drive system comprising, a DC motor; a DC power source; and pulse control means including means for generating said pulses at a substantially fixed frequency and adjustable means for varying the durations of said pulses over a predetermined range thereby to vary the energization of said motor, said pulse control means including also means for limiting the rate of increase of said durations for a predetermined time interval after said motor is initially energized whereby acceleration of said truck is correspondingly limited.

2. A drive system as set forth in claim 1 wherein said rate limiting means includes a capacitor, means for varying the charge on said capacitor as a predetermined function of time after initial energization of said motor, and means for limiting said durations as a function of the charge on said capacitor.

3. A drive system as set forth in claim 1 wherein said adjustable means comprises a multivibrator circuit including a variable resistance for adjusting the period of said multivibrator circuit and wherein said rate limiting means includes a transistor for variably shunting said resistance.

4. A drive system as set forth in claim 3 including a capacitor, means for charging said capacitor when said motor is deenergized, and for discharging said capacitor at a predetermined rate when said motor is energized, and means interconnecting said capacitor and said transistor for biasing said transistor to an extent which varies as a function of the charge on said capacitor whereby said durations are limited to a value which increases as said capacitor discharges following initial energization of said motor.

5. A drive system as set forth in claim 4 wherein said motor includes an armature and a field and wherein said system further comprises means interconnecting said motor with said source and said pulse control means to provide rotation in either direction and means responsive to a voltage across said armature in a direction opposing said pulses for charging said capacitor whereby the durations of said pulses are limited during plugging of said motor.

6. In an electric truck, a drive system comprising a DC series motor including an armature having a winding and including also a field winding connected in series with said armature winding, a DC power source; semiconductor current switching means for selectively applying to said motor from said source a series of unidirectional current pulses of uniform amplitude; pulse control means including means for generating said pulses at a substantially fixed frequency and adjustable means for varying the durations of said pulses over a predetermined range thereby to vary the energization of said motor; a first diode connected across both of said windings and orientated to be reverse biased by said pulses; and a second diode connecting one side of said source to said motor between said field and armature windings, said second diode being orientated to be reverse biased by said pulses and to be forward biased when said armature generates a voltage greater than said source voltage during plugging whereby plugging of said motor causes current generated in said armature to flow back into said source.

7. A drive system as set forth in claim 6 further comprising means responsive to a voltage across said armature opposing said pulses for limiting said durations to a value within said range, which value varies as a predetermined inverse function of said opposing voltage whereby plugging of said motor is limited according to said inverse function.

8. In an electric truck, a drive system comprising a DC motor including an armature having a winding, a DC power source; semiconductor current switching means for selectively applying to said motor from said source a series of unidirectional current pulses of uniform amplitude; and pulse control means including means for generating said pulses at a substantially fixed frequency and adjustable means for varying the durations of said pulses over a predetermined range thereby to vary the energization of said motor, said pulse control means including also means responsive to a flow of current in said armature winding in a direction opposing said pulses for limiting said durations to a value within said range which value varies as a predetermined inverse function of the magnitude of said opposing current whereby plugging of said motor is limited according to said inverse function.

9. A drive system as set forth in claim 8 wherein said adjustable means comprises a multivibrator circuit including a variable resistance for adjusting the period of said multivibrator circuit and wherein said duration limiting means includes a transistor for variably shunting said resistance and means for biasing said transistor as a function of said opposing current whereby the durations of said pulses are limited during plugging.

10. A drive system as set forth in claim 9 including a diode which connects said armature to said source and is oriented to be forward biased by said opposing current, said system including also a second transistor for controlling the biasing of the first said transistor and means for biasing said second transistor as a function of the reverse voltage generated across said armature by said opposing current.

11. In an electric truck, a drive system comprising, a DC motor, a DC power source, at least one contactor having contacts in series with said motor and having a winding which when energized closes said contacts; selectively operable means for energizing said winding thereby to energize said motor; semiconductor current switching means for selectively applying to said motor from said source through said contacts a series of unidirectional current pulses of uniform amplitude; and pulse control means including means for generating said pulses at a substantially fixed frequency and adjustabl e means for varying the durations of said pulses over a predetermined range thereby to vary the energization of said motor, said pulse control means including also means responsive to the deenergization of said contactor windings for immediately terminating the application of such pulses to said motor whereby when said contactor contacts open they do not break the pulse current.

12. A drive system as set forth in claim 11 further comprising means for limiting the rate of increase of said durations for a predetermined time interval after said contactor winding is initially energized whereby acceleration of said truck is correspondingly limited.

13. A drive system as set forth in claim 11 wherein said adjustable means comprises a multivibrator circuit and said means for generating said pulses includes an oscillator for applying a signal to trigger said multivibrator at said fixed frequency and wherein said terminating means comprises means for cutting off said signal when said contactor winding is deenergized.

14. A driving system as set forth in claim 13 including means for limiting the period of said multivibrator to a value which varies as a predetermined function of time after said contactor winding is initially energized thereby to correspondingly limit acceleration of said truck.

15. In an electric truck, a drive system comprising:
a DC motor;
a DC power source;
semiconductor current switching means for applying unidirectional pulses of current to said motor, said semiconductor current switching means including an output circuit connected in series with said motor and an input circuit for controlling conduction in said output circuit;
control circuitry interconnected with said input circuit for varying the duty cycle of said semiconductor current switching means, said control circuitry including a multivibrator circuit having a variable resistance for adjusting the period of said multivibrator circuit thereby to vary the duty cycle of said semiconductor switching means; and
a thermistor responsive to the temperature of said semiconductor switching means, said thermistor being interconnected with said variable resistance in said multivibrator circuit for reducing the duty cycle of said semiconductor switching means when the temperature thereof exceeds a predetermined level.

16. A drive system as set forth in claim 15 wherein said semiconductor current switching means comprise a plurality of parallel-connected transistors.

17. A drive system as set forth in claim 15 wherein said thermistor has a negative temperature coefficient of resistivity and is connected across said resistance.

18. In an electric truck, a drive system comprising a DC motor, a DC power source, semiconductor current means for selectively applying to said motor from said source a series of unidirectional current pulses of uniform amplitude, pulse control means including means for varying the mean current provided by said pulses over a predetermined range thereby to vary the energization of said motor, means for deenergizing said motor when a substantial voltage is applied thereto for longer than the period between successive pulses in said series whereby said motor is deenergized if a short occurs in said pulse control means, said pulse control means including means for generating said pulses at a substantially fixed frequency, adjustable means for varying the durations of said pulses thereby to vary their mean current; and said adjustable means including means for limiting the rate of increase of said durations for a predetermined time interval after said motor is initially energized whereby acceleration of the truck is correspondingly limited.

19. In an electric truck, a drive system comprising a DC motor, a DC power source, semiconductor current means for selectively applying to said motor from said source a series of unidirectional current pulses of uniform amplitude, pulse control means including means for varying the mean current provided by said pulses over a predetermined range thereby to vary the energization of said motor, means for deenergizing said motor when a substantial voltage is applied thereto for longer than the period between successive pulses in said series whereby said motor is deenergized if a short occurs in said pulse control means, said means for deenergizing said motor including a capacitor, means for charging said capacitor when a substantial voltage is applied to said motor, means for discharging said capacitor when substantially no voltage is applied to said motor, and means responsive to the charge on said capacitor for deenergizing said motor after a preselected period of charging of said capacitor.

20. A drive system as set forth in claim 19 wherein said charge responsive means includes an SCR and means for triggering said SCR when the voltage across said capacitor exceeds a predetermined threshold.